Figure 1:
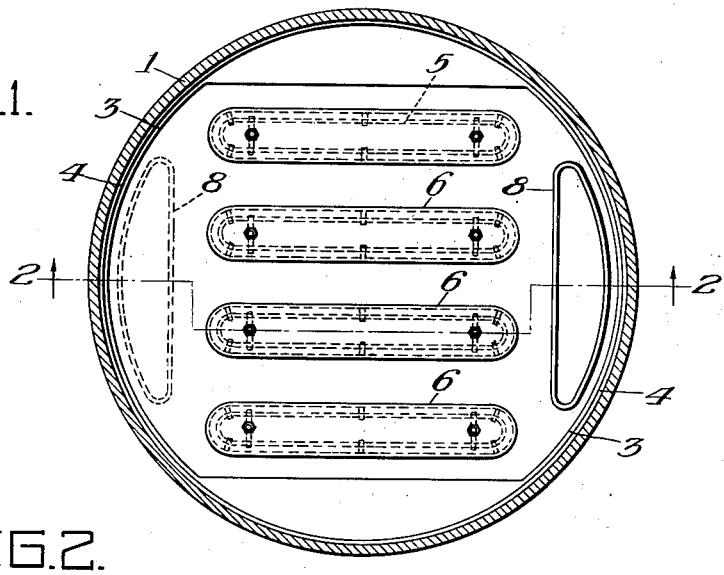

Aug. 31, 1937.   D. J. BERGMAN   2,091,349
FRACTIONAL DISTILLATION
Filed March 30, 1936   2 Sheets-Sheet 1

Inventor:
Donald J. Bergman,
By: Lee J. Gary
Attorney.

Aug. 31, 1937.   D. J. BERGMAN   2,091,349
FRACTIONAL DISTILLATION
Filed March 30, 1936   2 Sheets-Sheet 2

Inventor:
Donald J. Bergman
By: Lee J. Gary
Attorney

Patented Aug. 31, 1937

2,091,349

UNITED STATES PATENT OFFICE 2,091,349

FRACTIONAL DISTILLATION

Donald J. Bergman, Chicago, Ill., assignor to Universal Oil Products Company, Chicago, Ill., a corporation of Delaware Application March 30, 1936, Serial No. 71,668

5 Claims. (Cl. 261—114)

This invention relates to improvements in fractionating devices, such as used in refining processes, and more particularly to devices of this class which are designated as bubble towers.

In the large diameter high capacity bubble type fractionating columns used in modern refining processes such as high capacity cracking and/or topping plants, vacuum distillation processes and the like, the fractionating efficiency characteristic of smaller diameter columns is often sacrificed, due to the resistance offered by the vapor risers and bubble caps to the flow of liquid across the trays. This results in an appreciable difference in the head of liquid adjacent the inlet down-pipes as compared with that adjacent the outlet down-pipes and, consequently, since the vapors bubble through the liquid body on the trays a considerably larger volume of vapors passes through the bubble caps at points on the tray where the liquid level is relatively low than where a higher liquid level prevails. This materially reduces the fractionating efficiency of the column as compared with one wherein the level of liquid on the tray is substantially uniform, due to the non-uniformity of contact between the vapors and the liquid and excessive localized vapor velocity with resulting entrainment of liquid in the vapor stream.

One of the objects of this invention resides in improving the efficiency of such devices by reducing the liquid-head gradient on the bubble trays or pans and thereby reducing the differential in back pressure created by the liquid at different points on the tray which results in a more uniform distribution of vapors across the cross-sectional area of the column and more uniform fractionation thereof.

Another object of the present invention is to provide a simple and efficient method and means of maintaining a more uniform head of liquid over the entire tray by assisting the flow of liquid from the inlet to the outlet down-pipes. This is accomplished by so disposing the slots in the bubble caps through which the vapors pass into the main body of liquid on the tray that the vapors enter the liquid in the general direction of its natural path of flow to the down-pipes.

Although this invention is particularly advantageous as applied to fractionating column of five to six feet, or more, in diameter, it is also advantageous to a lesser degree in smaller diameter columns. The invention is applicable to fractionating columns employing any well known size and shape of bubble caps, but in its preferred embodiment elongated bubble caps arranged substantially parallel to the general direction of flow of the liquid on the tray are employed.

Figure 2:
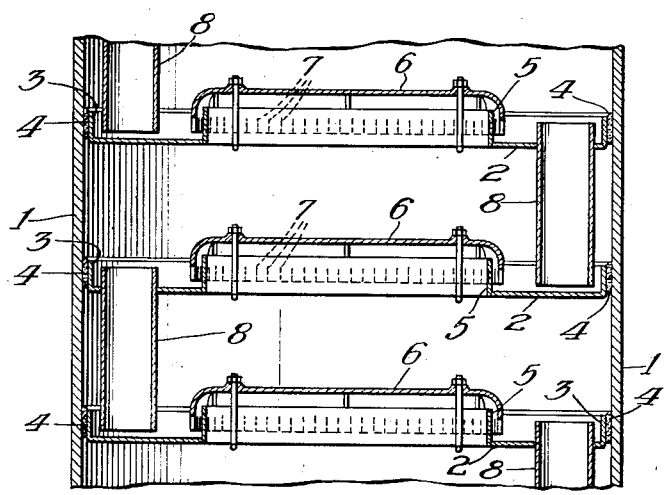
Figure 3:
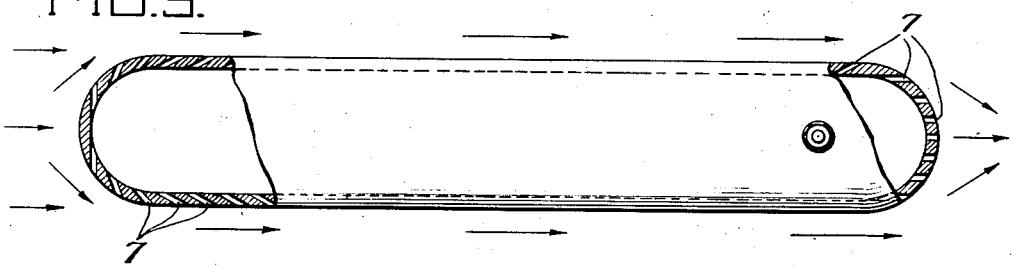
Figure 4:
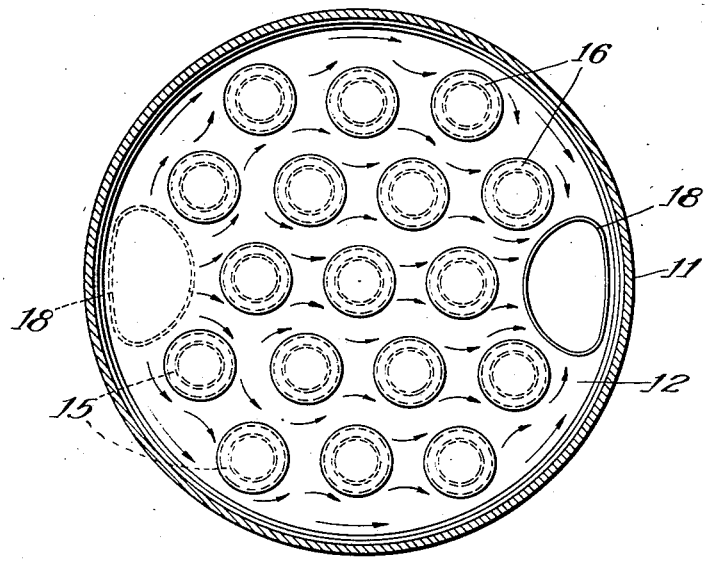
Figure 5:
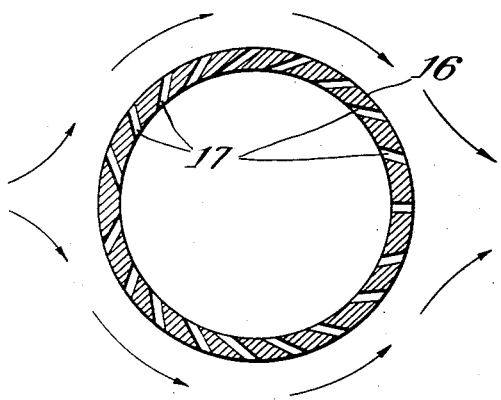
Figure 6:
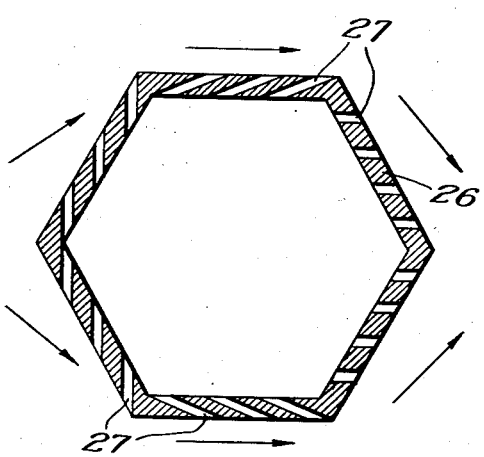

In the accompanying diagrammatic drawings Figs. 1, 2, 3, 4 and 5 illustrate two specific forms of apparatus embodying the features of the invention. Fig. 1 illustrates a cross-section through a fractionating column showing a plan view of one of the bubble trays which employs a plurality of substantially parallel elongated bubble caps. Fig. 2 is a cross-sectional elevation of a portion of the column taken along a plane indicated by the line 2—2 on Fig. 1. Fig. 3 is an enlarged detail of one of the bubble caps disclosed in Figs. 1 and 2, and is shown partially in section. Fig. 4 is a plan view of a bubble tray employing round caps. Fig. 5 is an enlarged cross-sectional detail of one of the caps of Fig. 4, showing the slots therein. Fig. 6 is a cross-sectional view of an hexagonal bubble cap containing slots arranged to conform with the invention.

Referring to Figs. 1 and 2, the cylindrical shell of the fractionating column is indicated at 1. Trays or pans 2 which, in the particular case here illustrated, have flanged or upturned edges 3, are disposed at spaced intervals in the column and may be supported in any well known manner, not illustrated. Suitable packing or the like indicated at 4 may be placed between the flanged edges of the pan and the shell of the column to prevent the passage of vapors through this space. Any of the other numerous well known methods of construction with respect to sealing the tower about the edges of the bubble deck or trays may be employed within the scope of the invention and, although not indicated in the drawings, the bubble decks or trays may be constructed in sections which are assembled after they are inserted through suitable openings such as manways, not illustrated, in the upper and/or lower portions of the column.

The vaporous and/or gaseous materials to be fractionated pass in a general upward direction through the column and enter each of the openings in each of the bubble decks provided by vapor risers 5 and are directed downward by means of bubble caps 6 and are thence directed from the space provided between risers 5 and caps 6 through slots 7 in the bubble cap into the main portion of a body of liquid maintained on the tray and the vapors which remain uncondensed by this contact and scrubbing action with the liquid pass from the surface thereof to the next higher tray or bubble deck.

The liquid maintained on the trays or bubble decks includes condensate from the vapors undergoing fractionation and may also include, when desired, cooling or refluxing liquid supplied to the column by well known means, not illustrated, from another portion of the system or from an external source. This liquid is supplied to each tray from the next higher tray by means of a suitable down-pipe 8 which extends sufficiently above the surface of the tray, as indicated in the drawings, to maintain the liquid on the tray at a suitable height and extends beneath the surface of the liquid on the next lower tray to form a liquid seal.

In the particular case illustrated in Figs. 1 and 2, a single down-pipe 8 supplies liquid to each tray from the next higher tray and a similar down-pipe delivers liquid from said tray to the next lower tray, the two down-pipes being disposed on opposite sides of the bubble deck. In this manner a continuous flow of liquid is maintained across the tray or bubble deck from the liquid inlet down-pipe to the liquid outlet down-pipe in a direction substantially parallel to the elongated bubble caps. As indicated in Fig. 3, the slots 7 provided in each bubble cap are disposed at an angle with respect to its axis such that each of the relatively small streams of vapors which pass through the slots enter the main body of flowing liquid on the tray in the same general direction as its normal direction of flow. This serves to assist the movement of the liquid body across the tray and wholly or partially compensates for the impedance offered to its flow by the bubble caps and risers.

When straight slots are provided in the bubble caps, as is the conventional practice, the relatively small streams of vapors passing through the slots into the main body of liquid on the tray enter the liquid body substantially at right angles to its normal direction of flow across the tray, thereby not only failing to assist its flow but actually impeding the same. This causes the liquid level to rise on the inlet side of the tray until it accumulates a sufficient head to overcome the resistance to its flow caused by the risers, bubble caps and the multiplicity of small streams of vapors. As a result of this unequal head of liquid on opposite sides of the tray a greater volume of vapors enters the liquid at its low point. This causes unequal distribution of vapors to the liquid body which acts as a scrubbing and condensing medium and materially impairs the efficiency of the fractionating column.

When the angular slots or openings in the bubble caps embodying this invention are utilized the vapors entering the moving body of liquid assist its flow and the liquid level on opposite sides of the tray is substantially equalized, resulting in a more uniform distribution of vapors throughout the column and more uniform and better contact between the vapors and the liquid. Consequently the efficiency of the fractionating column is maintained near the maximum obtainable for the particular design of column employed.

Referring particularly to Fig. 3, it will be noted that, in the case here illustrated, slots 7 are provided at spaced intervals around the entire periphery of the cap but it is entirely within the scope of the invention to omit the slots at one or both ends of the cap, when desired, and particularly at the end adjacent the liquid inlet to the bubble deck or tray.

Referring now to Fig. 4, the cylindrical shell of the fractionating column is indicated at 11 and bubble deck or tray 12 contains a plurality of vapor risers 15 surrounded by cylindrical bubble caps 16 and, as indicated in Fig. 5, each of the caps 16 have slots 17 in the lower portion thereof disposed at such an angle that the vapors passing therethrough enter the body of liquid flowing over the deck or tray 12 in a direction substantially parallel to the normal general direction of flow of the liquid past the bubble cap. The arrows in Figs. 4 and 5 indicate the general direction of flow of the liquid from down-pipe 18 on the inlet side of tray 12 to down-pipe 18 on the outlet side of tray 12.

It will be apparent with reference to Figs. 4 and 5 that the caps 16 adjacent the inlet and outlet down-pipes 18 are preferably oriented with respect to the caps centrally disposed on the bubble tray so that the flow of vapors through slots 17 of each individual cap assists the natural flow of the liquid in the vicinity of the individual caps.

It will, of course, be understood that any desired arrangement of down-pipes may be employed so that the flow of liquid over the bubble tray or deck may be, for example, from its central portion to its outer periphery or vice versa or a plurality of down-pipes may be employed to supply liquid to the deck on the inlet side with a plurality of down-pipes on the opposite side of the deck to remove the liquid therefrom. The invention is applicable to any desired arrangement of bubble caps and down-pipes.

Fig. 6 represents a cross-sectional view of a hexagonal bubble cap 26 taken along a section through the slots 27 and the arrows in Fig. 6 indicate the normal direction of flow of liquid around the bubble cap. Hexagonal bubble caps such as illustrated may be utilized in a deck arrangement such as illustrated in Fig. 4 in place of the round bubble cap shown or in any other desired manner.

The terms "fractionation", "fractionating means" and the like as used in the specification and appended claims is intended to include methods and means for contacting liquids and vapors or liquids and gases, generally, including absorption, scrubbing and stabilizing processes and devices generally as well as fractional condensing and/or distilling methods and means.

I claim as my invention:

1. Apparatus of the character described, comprising a fractionating column, a bubble tray disposed therein and over which a body of liquid flows, means for maintaining a flow of liquid over the tray, and means associated with the tray and comprising a bubble cap having angularly disposed slots for directing vapors into the body of liquid in the general direction of flow of the liquid.

2. Apparatus of the character described, comprising a fractionating column, a bubble tray disposed therein, and over which a body of liquid flows, and means associated with said tray and comprising a bubble cap having angularly disposed slots for directing a plurality of relatively small streams of vapor into the body of liquid in the general direction of flow of the liquid.

3. Apparatus of the character described, comprising a fractionating column, a bubble tray disposed therein and over which a body of liquid flows, liquid inlet and outlet openings associated with said tray, and means associated with said tray and comprising a bubble cap having angularly disposed slots for directing a plurality of small streams of vapor into the body of the liquid in a direction for assisting the flow of liquid toward the outlet opening.

4. Apparatus of the character described, comprising a fractionating column, a bubble tray disposed therein and over which a body of liquid flows, liquid inlet and outlet openings associated with said tray, said tray being provided with a vapor riser, and a bubble cap associated with said riser and having a plurality of angularly disposed slots therein arranged for directing streams of vapor into the liquid in the general direction of flow of the liquid toward the outlet opening.

5. Apparatus of the character described, comprising a fractionating column in which vapors pass therethrough in an upwardly direction, a plurality of superimposed bubble trays disposed in the column and over each of which a body of liquid flows from an inlet opening toward an outlet opening, conduits connecting the outlet opening of one tray and the inlet opening of the next lower tray, whereby said liquid is passed downwardly through the outlet of one tray and discharged through the outlet of the next lower tray, each tray being provided with one or more vapor risers, and a bubble cap associated with each riser, said cap being provided with a plurality of slots through which streams of vapors are directed into the liquid, said slots being disposed in angular relation for assisting the flow of the liquid from the inlet toward the outlet opening.

DONALD J. BERGMAN.